United States Patent
Wild et al.

(10) Patent No.: US 6,572,161 B2
(45) Date of Patent: Jun. 3, 2003

(54) MOUNTING FOR A COMPONENT OF SMALL DIMENSIONS

(75) Inventors: René Wild, Weissenburg (DE); Erwin Wachter, Ellingen-Stopfenheim (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/076,048

(22) Filed: Feb. 13, 2002

(65) Prior Publication Data

US 2002/0149212 A1 Oct. 17, 2002

(30) Foreign Application Priority Data

Apr. 11, 2001 (DE) .......................................... 101 18 112

(51) Int. Cl.$^7$ .............................................. B60R 19/48
(52) U.S. Cl. ...................................... 293/117; 293/136
(58) Field of Search ................................ 293/117, 136, 293/155, 561; 439/340, 550; 248/27.3; 362/226; 340/435

(56) References Cited

U.S. PATENT DOCUMENTS

| | | | | |
|---|---|---|---|---|
| 2,231,312 A | * | 2/1941 | Ache ........................... | 293/117 |
| 2,807,899 A | * | 10/1957 | Adams ......................... | 293/117 |
| 3,783,435 A | * | 1/1974 | Fisher .......................... | 439/340 |
| 3,794,278 A | * | 2/1974 | Frey et al. ................... | 248/27.3 |
| 3,794,997 A | * | 2/1974 | Iwatsuki et al. ............ | 293/117 |
| 4,213,644 A | * | 7/1980 | Scrivo et al. ............... | 293/117 |
| 4,831,503 A | * | 5/1989 | DeSantis et al. ........... | 362/226 |
| 4,996,634 A | * | 2/1991 | Haneda et al. .............. | 293/117 |
| 5,288,117 A | * | 2/1994 | Vogelgesang ............... | 293/117 |
| 5,833,283 A | * | 11/1998 | Shaw ........................... | 293/117 |
| 5,844,471 A | * | 12/1998 | Daniel ......................... | 340/435 |
| 5,984,389 A | * | 11/1999 | Nuber et al. ................ | 293/136 |
| 6,039,367 A | * | 3/2000 | Muller et al. ............... | 293/117 |
| 6,039,602 A | * | 3/2000 | Witkowski et al. ........ | 439/550 |
| 6,203,366 B1 | * | 3/2001 | Muller et al. ............... | 439/561 |
| 6,318,774 B1 | * | 11/2001 | Karr et al. ................... | 293/117 |
| 6,340,187 B1 | * | 1/2002 | Villiere et al. .............. | 293/117 |
| 6,422,643 B1 | * | 7/2002 | Pease ........................... | 293/155 |

FOREIGN PATENT DOCUMENTS

| | | | |
|---|---|---|---|
| JP | 58 177747 | * | 10/1983 |
| JP | 59 48250 | * | 3/1984 |
| JP | 6 171445 | * | 6/1994 |

* cited by examiner

*Primary Examiner*—Kiran Patel
(74) *Attorney, Agent, or Firm*—Fulbright & Jaworski L.L.P.

(57) ABSTRACT

The bumpers of motor vehicles nowadays are being used to an increasing extent to carry components of small size in which their position on a bumper is especially advantageous for their operation due to its exposed location. For example, it is known to build into the bumpers of vehicles flashers, parking lights and especially distance sensors (parktronic sensors, abbreviated PTS) which detect the distance from other vehicles or obstructions and are designed as parking aids. The components must be mounted such that when the bumpers are affected, especially by mechanical shock, any loosening or dropping out will be impossible. At the same time the mountings must be able to be made simply and inexpensively.

It is therefore proposed according to the invention that the tongues be affixed by feet to the bumper, or in case of a bumper of modular design, to one of its modules, and be positioned opposite the opening.

9 Claims, 2 Drawing Sheets

MOUNTING FOR A COMPONENT OF SMALL DIMENSIONS

BACKGROUND AND SUMMARY OF THE INVENTION

The invention relates to a mounting for a component of small dimensions on a bumper of a motor vehicle corresponding to the preamble of the first claim.

The bumpers of motor vehicles nowadays are being used to an increasing extent to carry components of small size, in which their position on a bumper is especially advantageous for their operation due to its exposed location. For example, it is known to build into the bumpers of vehicles flashers, parking lights and especially distance sensors (parktronic sensors, abbreviated PTS) which detect the distance from other vehicles or obstructions and are designed as parking aids. The term bumpers refers both to one-piece bumpers and to bumpers composed of modules where the components are inserted in the modules. The components must be mounted such that when the bumpers are affected, especially by mechanical shock, any loosening or drop-out will be impossible.

In distance sensors, for example, it is known to insert them into a pre-housing, and to fasten them therein with a clip and then by means of this pre-housing to clip them into the socket provided for the purpose in the bumper. This socket is, for example, dish-shaped, and is especially for this purpose molded or cemented to the bumper and contains recesses in its wall designed for the pre-housing to be snapped into them. Such a mounting requires complex tools to make it and since it is bipartite it requires assembly and storage.

The present invention as addressed to the problem of proposing a mounting which is easy to manufacture at low cost, and which offers the components secure seating and nevertheless permits easy replacement.

The solution of the problem is accomplished by means of the distinctive features of the first claim. Advantageous embodiments of the invention are claimed in the subordinate claims.

DETAILED DESCRIPTION

Compared with the known mountings, a mounting according to the invention is of very simple design. The essential components of the mounting consist of two tongues, each having a foot affixed to the bumper or, in the case of a modular bumper, to one of its modules. These tongues are resilient and are perpendicular to the surface of the bumper at the opening which receives the component.

On account of the simple design of the molds required in order to form the tongues, the tongues can be formed together with the formation of the entire bumper or, in the case of a modular design, with the formation of a module, or they can easily be molded in place. Since the mounting is integrated in one piece with the bumper, the previously necessary additional part and the preassembly thereof are eliminated. The attachment of the component to the tongues is advantageously made releasable by means of a clip fastening, in which case lug-like projections snap into recesses or undercuts in a known manner.

In further embodiment of the invention, the tongues of the mounting on at least one side of the opening for the accommodation of the component are joined together in their base area by a bridge the shape of which is substantially that of the external contour of the component to be mounted. This bridge makes the mounting stable, holds the component in its position, and facilitates its installation by its possible lateral guidance when it is pushed into the mounting. The mounting is given special stability if the bridge is joined to the module or to the bumper by a thin wall.

The bridge between the two tongues, however, can also be separated by a gap from the bumper or from the bumper module, resulting a more elastic construction. The injection molding of the mounting and its removal from the mold is also simplified, especially if the contour of the bumper or module is curved.

Since in an additional embodiment of the invention at least one of the tongues is elastically joined to the bridge, the introduction of the component into the mounting and its possible removal therefrom is facilitated. The elasticity can be achieved by providing a notch between the tongue and the bridge.

The invention is further explained with the aid of an example

DESCRIPTION OF THE PREFERRED EMBODIMENT

DETAILED DESCRIPTION OF THE PREFERRED EMBODIMENT

Figure 1:
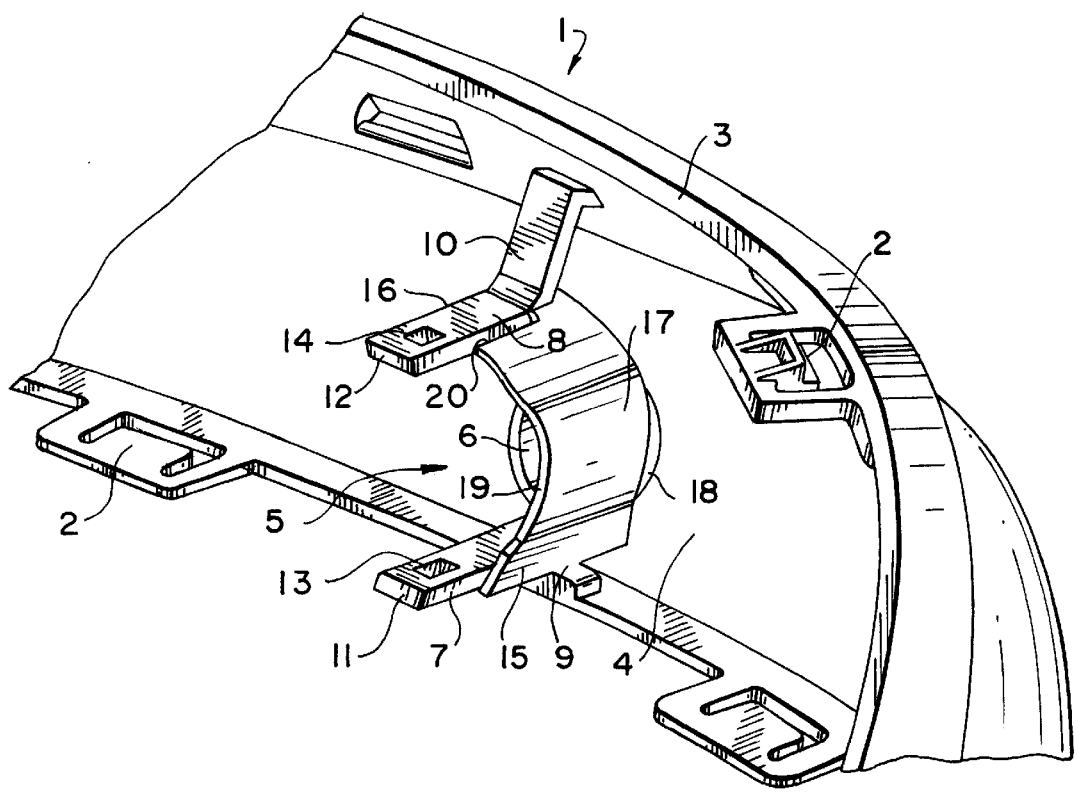
FIG. 1 is a perspective view of the mounting in one module of a bumper.
Figure 3:
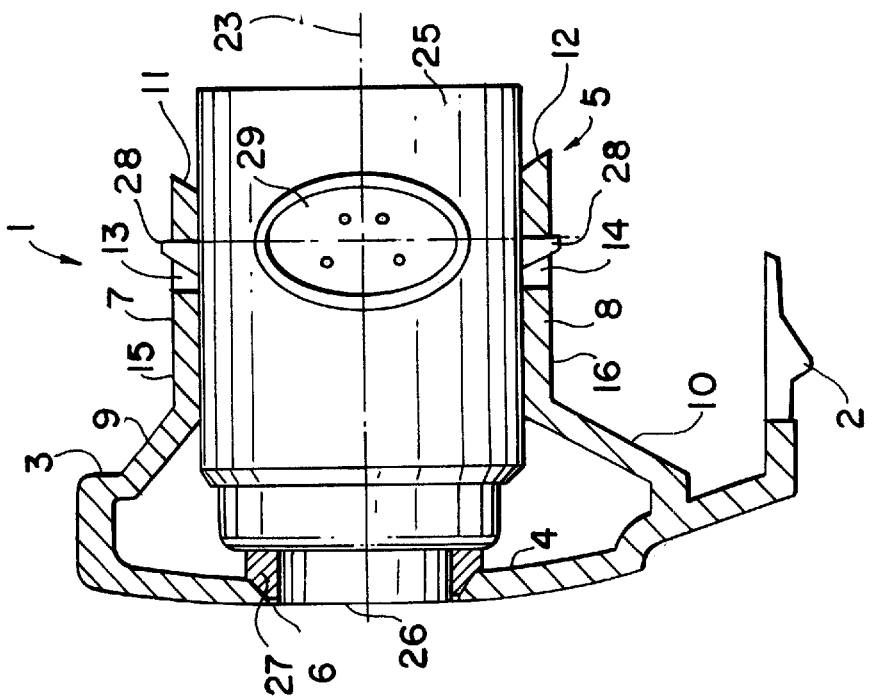
FIG. 3 is a section through the module with a distance sensor inserted into the mounting.

A module of a bumper is not fully represented here. Fastening means 2 in the form of catches on the edge 3 of module 1 permit snap fastening to the structure of the bumper. The contour 4 of the module 1 is curved. A mounting 5 according to the invention on the inside of module 1 accommodates in the present embodiment a distance sensor 25, a PTS, as represented in FIG. 3. The distance sensor 25 looks through a circular opening 6 in module 1, and a cover 26 of the sensor opening is flush with the outer contour 4 of module 1. The opening 6 in FIG. 1 is almost completely concealed by the mounting 5.

The main features of the mounting 5 are the two tongues 7 and 8. They are injection molded at their feet 9 and 10 onto the module 1. For easier insertion of the distance sensor, the free ends are chamfered, 11 at the tongue 7 and 12 at the tongue 8. Openings 13 on tongue 7 and 14 on tongue 8, and 14 on tongue 8 serve to accommodate lug-like projections 28 on the housing of the distance sensor 25 and thus result in a snap fastening, as can be seen in FIG. 3.

The foot portion 15 of tongue 7 and the foot portion 16 of tongue 8 are joined together by a bridge. In the present embodiment the bridge 17 is separated by a gap 18 from the curved contour 4 of the module 1, facilitating attachment to the module and improving the elasticity of the mounting. In another embodiment, the bridge 17 can be bound by a thin wall to the curved contour 4 of the module or bumper 1. The upper margin 19 of the bridge 17 points inwardly, that is, it is beveled toward the opening to facilitate the insertion of the distance sensor.

To be able to produce a releasable clip connection between the distance sensor and the mounting 5, at least one of the tongues must be resiliently attached to the bridge 17. In the present embodiment the tongue 8 is resiliently attached to the bridge 17. From the upper margin 19 of the bridge 17 a notch 20 runs between the tongue 8 and the bridge 17 to about two thirds the width of the bridge. Thus it is possible when the distance sensor is inserted into the mounting for the tongue 8 to flex away unhampered by the bridge 17. The mounting 5 is made of a plastic which has a certain elasticity and thus permits the tongue 7 and especially tongue 8 to flex back when the clip connection is made, so as to avoid breaking off the tongues.

Figure 2:
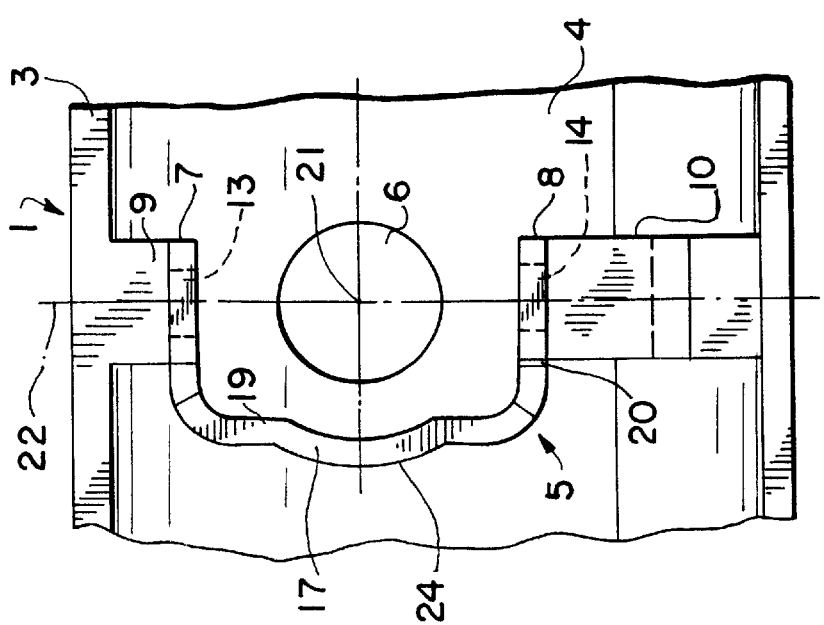
FIG. 2 is an elevation of the mounting in the bumper module.

In FIG. 2 there is shown a view of the back of the module 1 in the area of the mounting 5. The lines of symmetry 22 and 23 pass at right angles to one another through the center 21 of the opening 6. The mounting 5 is connected with the module by the feet 9 and 10 which are intersected by the line of symmetry 22. The two tongues 7 and 8 lie opposite one another on the line of symmetry 22. The bridge 17 passes around the opening 6, and the bulge 24 corresponds to the contour of the distance sensor that is to be installed.

The view in FIG. 3 corresponds to a section in the plane along the line of symmetry 22. In this figure the distance sensor 25 is shown inserted into the mounting 5. The distance sensor 25 extends with its sensor opening, whose cover 26 is flush with the surface of the module 1, through the opening 6 and supports itself through a ring 27 of an elastic material on the margin of the opening 6. The tongues 7 and 8 rest on the outer contour of the distance sensor 25. The nose-like projections 28 on the housing of the distance center engage in the opening 13 of tongue 7 and the opening 14 in tongue 8, respectively, and thus fix the distance sensor in the mounting 5. Also shown is the socket 29 for connecting the signal line to the electronic circuit, not shown, of the sensor.

What is claimed is:

1. A mounting for a component of small dimensions on a bumper of a motor vehicle wherein the component penetrates the bumper in an opening, said mounting comprising:

two resilient tongues by which the component can be affixed in a predetermined position by a releasable connection, wherein said tongues are affixed each at a foot to the bumper and are positioned opposite one another at the opening.

2. The mounting according to claim 1, wherein the tongues are connected to one another at least on one side of the opening in the area of its feet by a bridge.

3. The mounting according to claim 2, wherein said bridge has substantially the outer contour of the component.

4. The mounting according to claim 1, wherein said bridge is separated from the bumper by a slot between said two tongues.

5. The mounting according to claim 1, wherein said bridge is connected to the bumper between said two tongues.

6. The mounting according to claim 1, wherein a resilient connection exists between at least one of said tongues and said bridge.

7. The mounting according to claim 6, wherein a notch is provided between said tongue and said bridge.

8. The mounting according to claim 1, wherein said bumper is modular.

9. The mounting of claim 1, that is integral with the bumper.

* * * * *